(12) United States Patent
Lang

(10) Patent No.: US 7,356,432 B1
(45) Date of Patent: Apr. 8, 2008

(54) SYSTEM TEST MANAGEMENT SYSTEM WITH AUTOMATIC TEST SELECTION

(75) Inventor: Michelle J. Lang, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 182 days.

(21) Appl. No.: 11/437,439

(22) Filed: May 19, 2006

(51) Int. Cl.
*G01R 27/28* (2006.01)
(52) U.S. Cl. .................. 702/117; 702/118; 702/119
(58) Field of Classification Search ............ 702/117, 702/118, 119, 120, 123
See application file for complete search history.

(56) References Cited

U.S. PATENT DOCUMENTS 6,215,324 B1 * 4/2001 Yoshida ................. 324/760
6,742,148 B1 * 5/2004 Korhonen ............... 714/718

* cited by examiner

*Primary Examiner*—John Barlow
*Assistant Examiner*—Stephen J. Cherry
(74) *Attorney, Agent, or Firm*—Charles A. Johnson; Robert Marley; Crawford Manunu PLLC

(57) ABSTRACT

Various approaches for testing an electronic system are disclosed. The hardware units of a hardware configuration of the system are determined, and a time constraint parameter value is input. Also input is a hardware unit type identifier that specifies a first type of hardware unit of the electronic system to be tested. A database that describes a plurality of test programs is provided, and from the database at least one test program that tests the specified type of hardware unit is selected. A subset of identifiers of the hardware units of the configuration is selected for testing based on the input time constraint parameter value and the type of hardware unit tested by the at least one test program. The at least one test program is executed on the electronic system with the identifiers of the subset of hardware units as inputs.

20 Claims, 10 Drawing Sheets

SYSTEM TEST MANAGEMENT SYSTEM WITH AUTOMATIC TEST SELECTION

FIELD OF THE INVENTION

The present disclosure generally relates to managing tests performed on a computing arrangement.

BACKGROUND OF THE INVENTION

Testing large-scale computing systems is complicated, time-consuming, and therefore, very expensive. Comprehensive and thorough testing at the system level may entail tests directed to functions and performance of processors, cache coherency, memory, and input/output (I/O). Companies will sometimes have one or more groups of people dedicated to testing computing systems.

It is not uncommon for a test group to have accumulated a large number of tests over years of system testing. The tests represent years of accumulated effort and expertise. Since the tests themselves have been debugged, run against various different computing platforms, and at some time proved useful in verifying the integrity of a system or uncovering defects, reuse of tests may reduce the overall test effort.

Tests are generally implemented as a set of one or more executable programs, and each test is constructed to target some aspect of the system. A test generally requires the user to specify some amount of information that describes the system configuration. For example, the tester (or "end user") may be required to specify identifiers for processors as well as the physical and/or logical disks in the system. The end-user knows, for example, that the system has eight processors—but may be unaware that these processors are distributed across two nodes with both local and shared caches. The end-user may be aware that the target system has C and D logical disk drives, but the user may not know that these drives are located on two different physical disks, use different device drivers, and reside on two different I/O buses.

If the end-user requires that a certain controller such as a specific device driver or a particular bus be the target of a test, the user is responsible for translating the requirement into terms the test will understand. This may require significant effort and investigative work, which may need to be repeated each time the test is moved to another system, or the configuration is changed on a system on which a test is to be rerun. Changes in hardware may make diagnosing hardware problems difficult and time-consuming.

Incorporating the capability to recognize particular configuration characteristics into individual tests may not be feasible. For example, tests may come from a variety of sources and may differ considerably in parameterization and input methods. In addition, tests may be written in different languages and have different internal structures. Some tests may be well documented, and others may be undocumented. For some tests, the source code may not be available.

Even if individual tests could be modified, enhanced, or adapted to recognize internal system hardware infrastructure, the effort and maintenance may outweigh the benefits. The tester would still be required to manually input parameters, schedule and monitor tests, and determine the appropriate mix of tests necessary to ensure adequate testing of the entire hardware system A method and system that address these and other related issues are therefore desirable.

SUMMARY OF THE INVENTION

The invention provides various embodiments for testing an electronic system. In one embodiment, the hardware units of a hardware configuration of the system are determined, and a time constraint parameter value that describes an amount of time available for testing the system is input. Also input is a hardware unit type identifier that specifies a first type of hardware unit of the electronic system to be tested. A database that describes a plurality of test programs is provided, and from the database at least one test program that tests the specified type of hardware unit is selected. A subset of identifiers of the hardware units of the configuration is selected for testing based on the input time constraint parameter value and the type of hardware unit tested by the at least one test program. The at least one test program is executed on the electronic system with the identifiers of the subset of hardware units as input.

In another embodiment, an apparatus is provided for testing an electronic system. The apparatus comprises means for identifying hardware units of a hardware configuration of the system; means, responsive to an input hardware unit type identifier, for selecting from a database that describes a plurality of test programs, at least one test program that tests the type of hardware unit to be tested, wherein the database specifies for each test program, each type of hardware unit tested by the test program, wherein the hardware unit type identifier specifies a first type of hardware unit of the electronic system to be tested; means, responsive to an input time constraint parameter value, for determining identifiers of a subset of the hardware units of the configuration for testing based on the input time constraint parameter value and the type of hardware unit tested by the at least one test program, wherein the time constraint parameter value describes an amount of time available for testing the system; means for inputting the identifiers of the subset of hardware units to the at least one test program; and means for executing the at least one test program on the electronic system.

In another embodiment, a system is provided for testing an electronic system. The system includes a plurality of test programs, a test descriptor database, and a test manager. The test descriptor database describes for each test program, each type of hardware unit of the electronic system tested by the test program. The test manager is configured to establish data that identifies hardware units of a hardware configuration of the system and select, responsive to input of a hardware unit type identifier that specifies a first type of hardware unit of the electronic system to be tested, at least one test program that tests the type of hardware unit to be tested. The test manager further selects, responsive to input of a time constraint parameter value that describes an amount of time available for testing the system, identifiers of a subset of the hardware units of the configuration for testing based on the input time constraint parameter value and the type of hardware unit tested by the at least one test program. Based on the selected test program(s) and parameter values, the test manager initiates execution of the test program(s) on the electronic system with input of the identifiers of the subset of hardware units.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
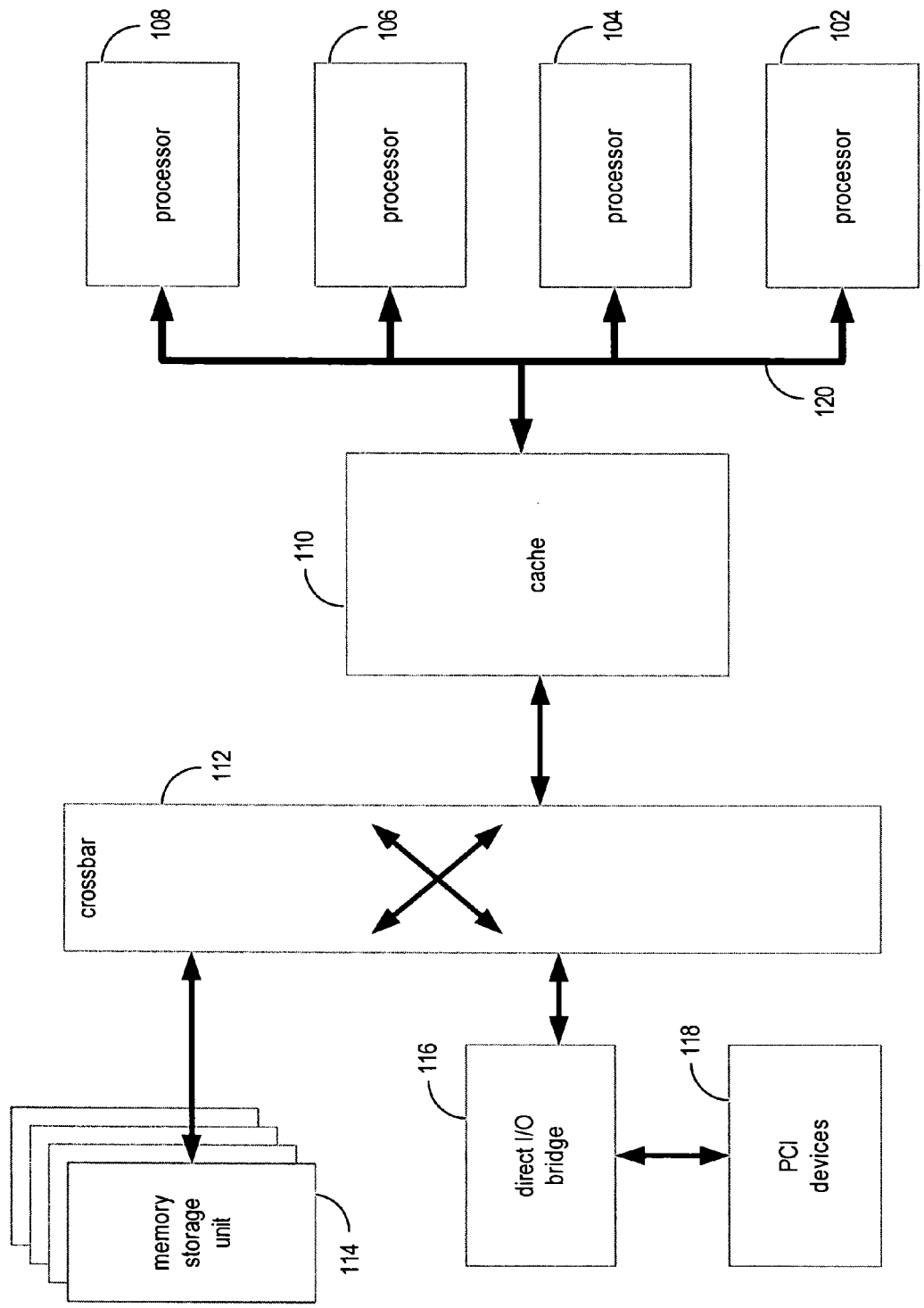
FIG. 1 is a block diagram of an example processing cell, which is part of a system, upon which various test programs may be executed.

FIG. 1 is a block diagram of an example processing cell, which is part of a system, upon which various test programs may be executed. A typical processing cell, or sub-pod, is comprised of multiple Central Processing Units 102-108 and a corresponding Cache 110. The processing units may be of the 128 bit McKinley processor family as produced by Intel Corp., the 64-bit, IA-64 Itanium family, also produced by Intel Corp., or may, for example, be of the 32-bit, Xeon processing family, also produced by Intel Corp. Each of processors 102-108 share Cache 110 through bus 120, where bus 120 may serve up to, for example, four processors 102-108. Memory Storage Units 114 provide a shared memory pool for Processors 102-108 through non-blocking cross-bar 112. Direct IO Bridge 116 provides high-throughput access to Peripheral Component Interconnect devices 118. It should be noted that the present invention is not limited for use with only those type of units and/or architectures listed above and shown in FIG. 1 or the remaining Figures, but may be used with any other type of unit and/or architecture suitable for use in a data processing environment.

Memory Storage Unit 114 may consist of up to four main memory banks each of which may contain a maximum of 16 Gigabytes of Random Access Memory. Likewise, Cache 110 may comprise up to four banks of cache (not shown), each cache bank may contain up to 32 Megabyte of RAM, which is on the order of five times faster than Memory Storage Unit 114 RAM. Each cache bank has a dedicated, direct connection to each of Memory Storage Units 114, each direct connection being supported by crossbar 112. In one embodiment, memory Storage Unit 114 has a typical mainframe design, such that each Memory Storage Unit 114 may handle hundreds of access requests concurrently. Even higher performance may be realized by allowing interleaving between each Memory Storage Unit 114. When interleaving is enabled, data may be spread across all Memory Storage Units 114 and may be accessed in parallel by any one of Processors 102-108 and/or Cache 110. Crossbar 112 allows for fast, consistently low latency, high bandwidth transmissions between cache 110 and IO bridge 116.

Multiple sub-pods, like the sub-pod illustrated in FIG. 1, may be combined to provide a highly scalable solution for today's demanding enterprise environments in accordance with the present invention. According to an exemplary embodiment, a single configuration of multiple sub-pods may include a total of 32 processors, along with eight cache modules, 64 GB of main memory, four cross-bars and eight direct I/O bridges to support a total of 96 PCI slots.

Figure 2:
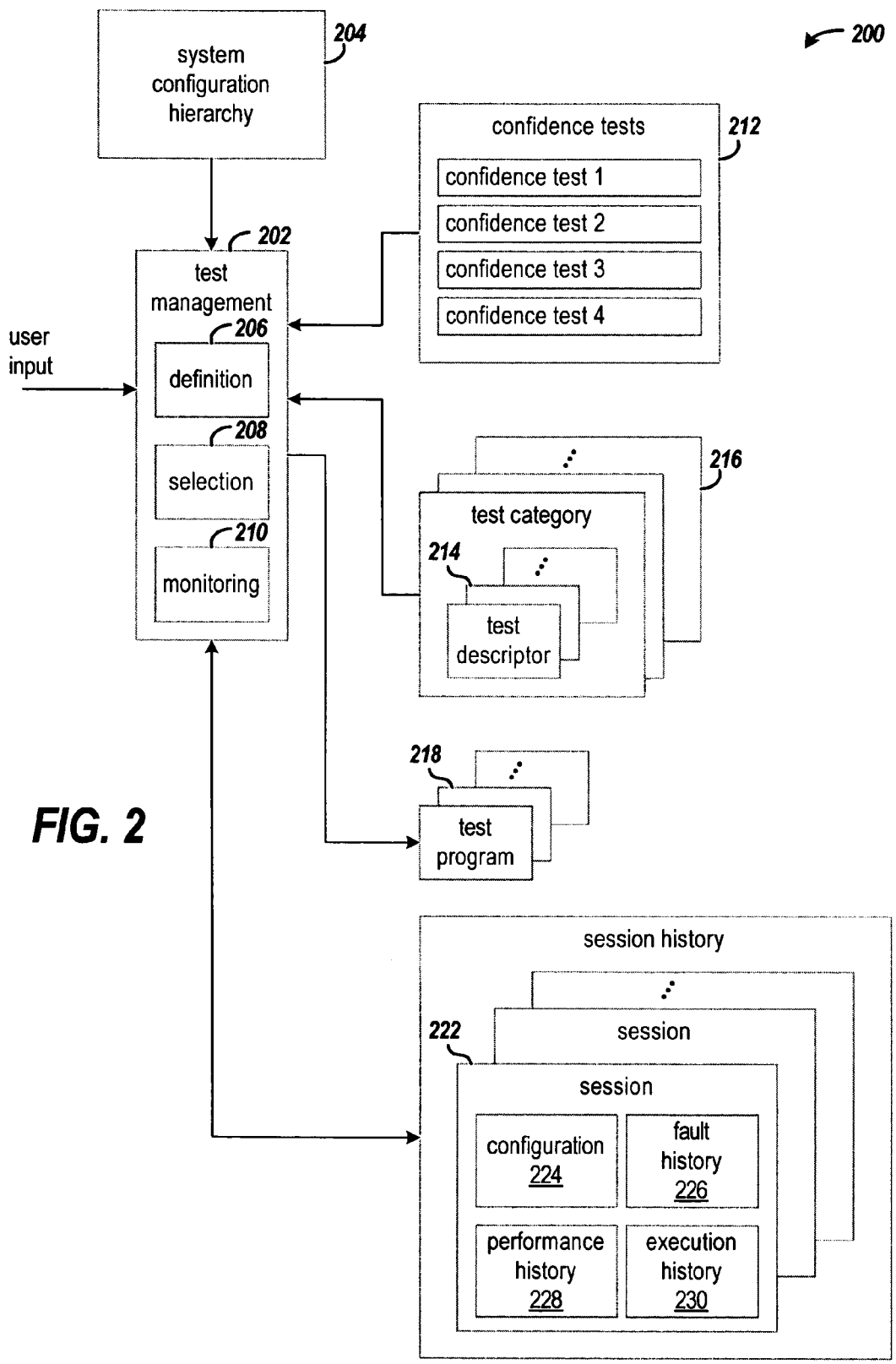
FIG. 2 illustrates a test management system in accordance with one embodiment of the invention.

FIG. 2 illustrates a test management system 200 in accordance with one embodiment of the invention. The test management system 200 includes a test management component 202 for managing test activities. The test management component 202 responds to user input for directing test activities and uses system configuration data as set forth in the system configuration hierarchy 204 to determine which particular tests to execute. The test management component 202 includes test definition logic 206, test selection logic 208, and test monitoring logic 210.

Each of confidence tests 212 is used to describe a functional area of the system to be tested and is mapped to one or more test descriptors 214 included with a "test base". The test base is divided into test categories 216.

Confidence tests typically map to one or more test descriptors in the test base because there may be one or more tests desired for testing the functionality specified by a confidence test. The test descriptors in a test category relate to a particular functional unit of the system under test, for example, cache, memory, processor, and input/output (I/O).

The test programs 218 are executable programs that are referenced by the test descriptors 214. Each test program performs a set of operations that exercise certain functions of the system under test. Parameter values that are input to a test program may designate a particular hardware unit to which the operations are directed, for example a specific disk drive in the system.

The test management component 202 tracks data gathered in association with running a confidence test. A test session 222 is created each time a confidence test is run. The gathered data includes configuration data 224 of the system at the time of the test, fault history data 226 that describes any fault conditions detected in performing the test, performance history data 228 that describes performance characteristics of the system while performing the test, and execution history data 230 that describes runtime parameter values and targeted hardware units of the test.

Figure 3:
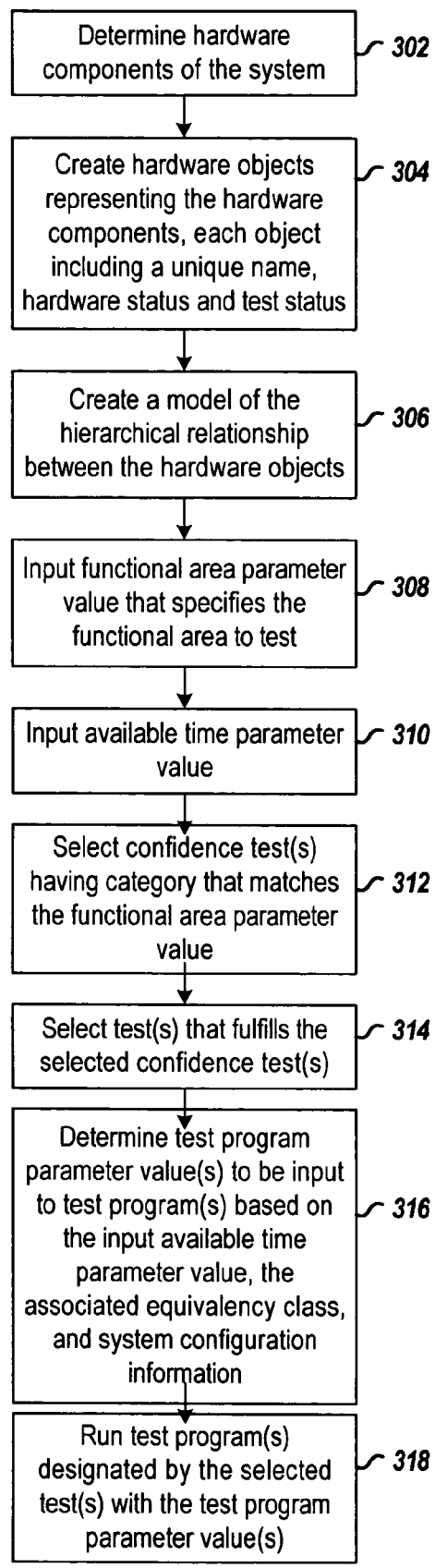
FIG. 3 is a flowchart of an example process for selecting one or more tests and one or more input parameter values for the tests in accordance with various embodiments of the invention.

FIG. 3 is a flowchart of an example process for selecting one or more tests and one or more input parameter values for the tests in accordance with various embodiments of the invention.

The process commences with creating a model of the system under test. The hardware units of the system are determined at step 302. For each of the determined hardware units, an object that represents the hardware unit is created ("hardware object") at step 304. It will be recognized that a hardware object is actually an object created in software to represent the hardware unit and is not an article of hardware. Each hardware object has associated data that sets forth a unique name, a hardware status, and a test status. A model of the hierarchical relationship between the hardware objects is created at step 306.

Information obtained from the operating system is combined with system design information to create a complete hierarchical view of the system—allowing translation of hardware units into corresponding equivalent (from a test point of view) end-user components. Some examples of typical end-user components are physical disks, logical drives, and instruction processors. These are the components with which a particular one of test programs 218 has been designed to work. Identifiers of these components are typically input as parameter values to the test programs. The translation of top level hardware units to end-user components allows existing tests to be reused without modification for different system configurations.

System configuration information is obtained from the host operating system. In the case of a Windows® operating system implementation, the Windows Management Interface (WMI) can be used to obtain the operating system (OS) view of the system. Using WMI, detailed information about processors, network adapters, physical disks, I/O controllers, device drivers, logical drives, I/O buses, etc.—along with their relationships—is obtained. Using an object-oriented approach, each hardware unit becomes an object (hardware object), with corresponding properties, methods, and links—as well as test execution status and failure rate.

Once this phase of the configuration process is complete, the next step is to add hardware objects related to proprietary or platform specific information. For example, in the case of a Unisys ES7000-type system this information can be obtained from the BIOS information table that has been written to a fixed area of shared memory. The BIOS information table contains information about cells, processor nodes, memory nodes, and I/O nodes, all of which are components that may be unknown to the operating system, but crucial to the diagnosis of hardware problems.

System design information regarding bus number allocation is used to map Peripheral Component Interconnect (PCI) buses to I/O nodes. Processor information contained in the BIOS information table is used to map each processor to an associated processor node. The hardware units known to the OS and hardware units specific to the implementation are modeled in a single data structure.

When desired, additional "logical" hardware objects may be created. These are objects that do not have explicit representations when viewed by the host OS or BIOS and may or may not have an explicit physical hardware counterpart. Some of these logical hardware objects may represent hardware unit inter-connections. For example, although not explicitly described by the Windows OS, a processor bus may become a hardware object. The set of all third level caches may become another hardware object. A logical drive is an example of a component that is treated as a hardware object by many test programs since it allows user-mode programs access to the physical drives on the system.

These logical hardware objects frequently stem from insider knowledge of the system—sometimes called domain knowledge—and are an important part of a completely described configuration. Like other hardware objects, logical hardware objects must translate to lower level, end-user components.

For testing purposes the source of the information about a hardware unit is immaterial once the model of the hardware configuration is complete. Each hardware unit, whether it originated from OS info, BIOS info, or domain knowledge, becomes a hardware object capable of being targeted during the system test phase.

Figure 4:
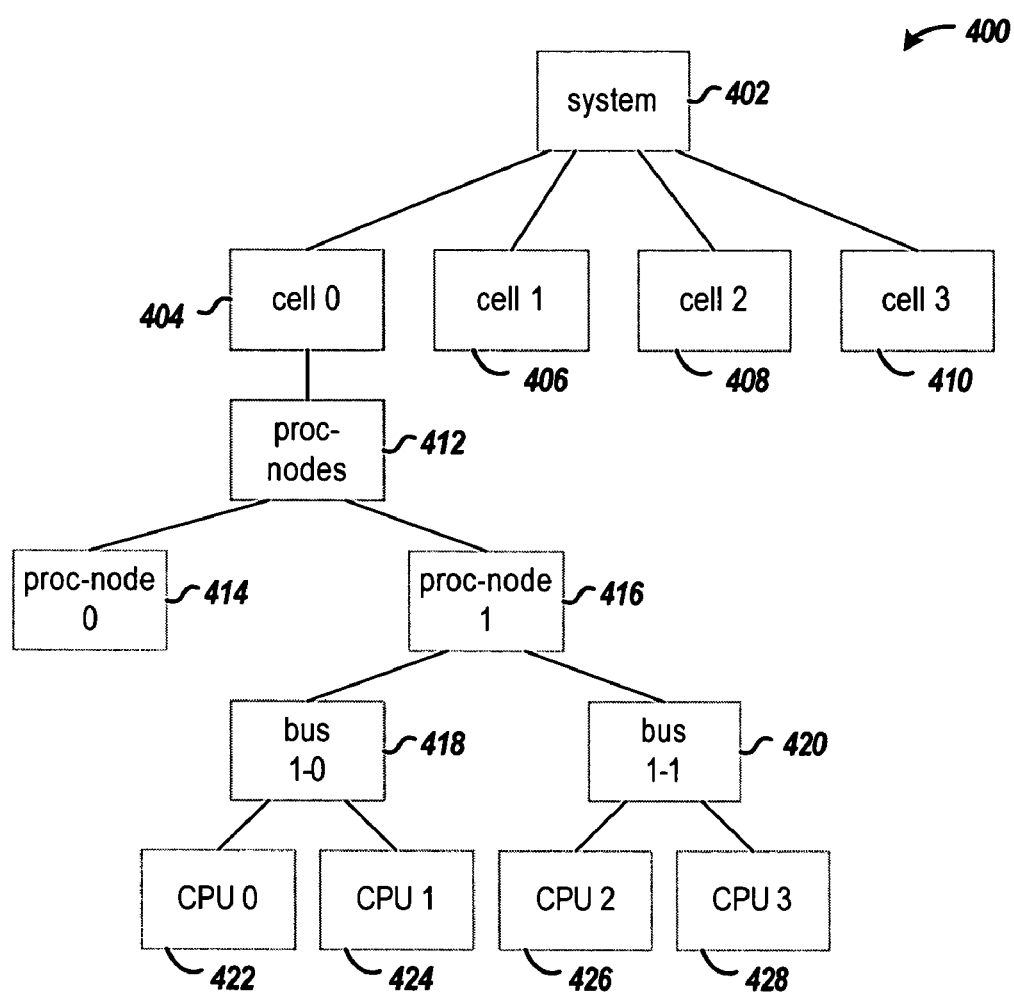
FIG. 4 illustrates a hierarchical view of the hardware objects in a system under test.

The physical and/or logical connections between the hardware units from which the hardware objects were created are represented as a hierarchical model (see FIG. 4).

With the system configuration determined, the user may input data that specifies the functional area of the system to be tested (step 308). Along with the area to test, the user may also input data that specifies the time available to test the selected functional area (step 310). This feature is useful in situations such as when there is only a limited time available to test the system, and running a representative subset of tests may be sufficient.

In response to the input data that specifies the functional area to test, one or more confidence tests are selected (step 312). From the selected confidence test(s), the set of associated test descriptor(s) is determined and appropriate test(s) selected (step 314). Based on the input available time parameter value, the test program parameter value(s) to be input to test program(s) is determined (step 316). Generally, if there is a greater amount of time available, a greater number of hardware units in the system may be tested, and if there is a lesser amount of time available, a representative set of hardware units may be tested. The representative set of hardware units is determined using equivalence classes, which generally group similar hardware units and are described in further detail below. The test program(s) designated by the selected test(s) is executed with the test program parameter value(s) (step 318).

In another embodiment, test priorities may be used to select a suitable test descriptor. Test descriptors may be assigned respective priority values. If multiple tests test the same aspect of the system—i.e. belong to the same category and sub-category, have same functional and performance characteristics, and target the same unit types—the priority values may be used to give execution priority to one test over another. Thus, if between two tests the category, sub-category, functional and performance characteristics, and targeted hardware unit are all equal, the test having the higher priority value would be selected over the test with lower priority value. The priority value could be used to ensure that a test that is considered an exceptionally "good" test, or has a history of uncovering test problems, will be run first.

The priority values need not be assigned directly nor remain static. Priority values may be inferred from historical data about the test's execution history, fault history, and the performance history. Inferred priority values may be combined with directly assigned priority values to create respective overall test priority values that reflect the relative strength of the test.

FIG. 4 illustrates a hierarchical view 400 of the hardware objects in a system under test. The hardware objects are linked according to their physical and/or logical connections. The top-level objects are linked to lower-level objects that correspond to the tester's view of the system relative to the test programs.

The top-level object 402 represents the entire system under test. "Parent" object 402 includes as "children" objects 404, 406, 408, and 410, which represent cells identified as cells 0-3 of the system. Cell 0 includes logical hardware object 412, which represents the proc-nodes of cell 0. There is no explicit description in the operating system or BIOS of a proc-nodes hardware unit. However, the proc-nodes object represents a significant aspect of the architectural system and is represented as a logical hardware object. For example, since two processor nodes share a third level cache, the ability to test inter-node activity is necessary to the integrity of the system. Logical units may be defined at any level of architecture.

The hierarchical view further includes objects 414 and 416, which represent the hardware units proc-node 0 and proc-node 1 of the system. Proc-node 1 includes buses 1-0 and 1-1, which are represented as objects 418 and 420. CPU 0 and CPU 1 are connected to bus 1-0, and CPU 2 and CPU 3 are connected to bus 1-1. Thus, objects 422 and 424 are under the object for bus 1-0 and objects 426 and 428 are under the object for bus 1-1.

Objects that connect a node with the root node 402 of the hierarchy may be referred to as "ancestor nodes". Thus, nodes 418, 416, 412, and 414 are ancestor nodes of node 422. Root node 402 is likewise considered an ancestor node of node 422.

As discussed above, after logic units are defined, they are treated like any other hardware component, and can be translated into their end-user components for interpretation by a test program. Whether an object is an end-user component depends on whether the object is the target of a test program. For example, CPU 0, CPU 1, CPU 2, and CPU 3 would be end-user components for a test program that targets processors, and an object such as proc-node 1 would not be an end-user component. However, to a test that directly targets a processor node without requiring access to the processors, proc-node 1 is an end-user component.

Figure 5:
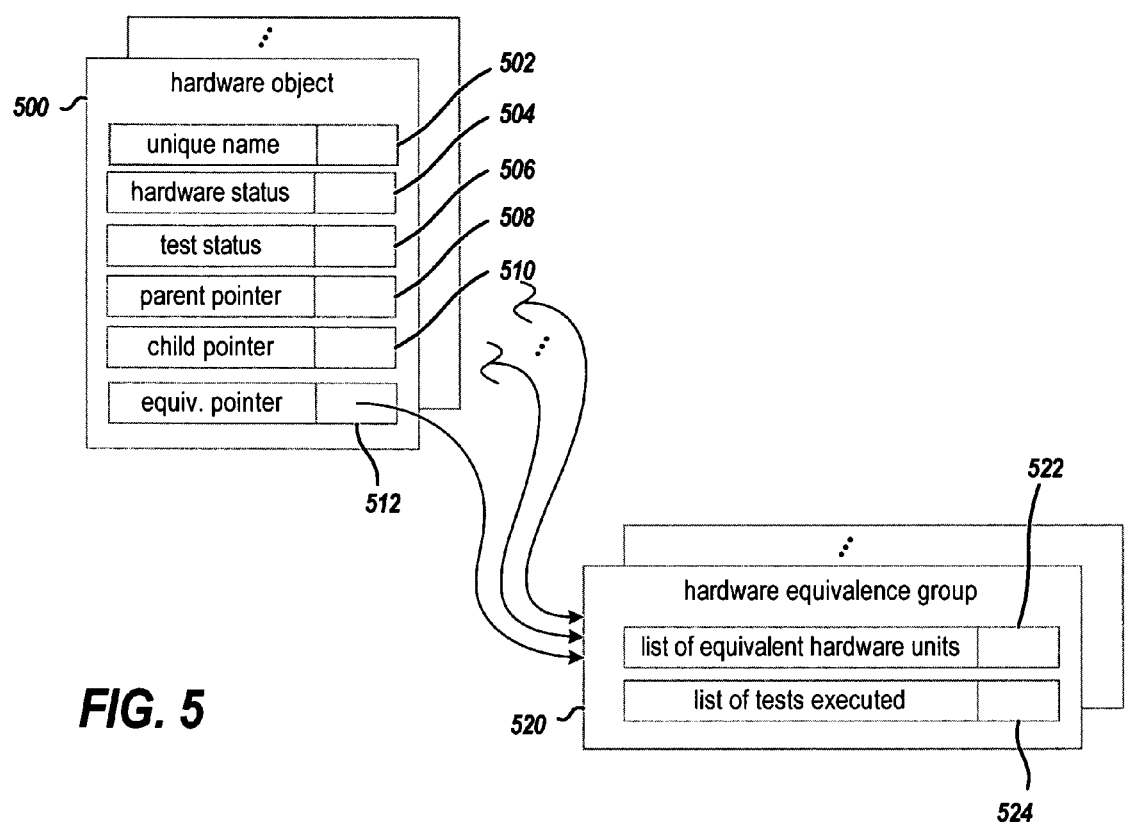
FIG. 5 is a block diagram that shows hardware object data for representing a hardware unit of a system.

FIG. 5 is a block diagram that shows hardware object data for representing a hardware unit of a system. A hardware object 500 contains properties and methods that are pertinent to all hardware objects in the class. For example, each object has a unique name 502, a hardware status 504, and a test status 506. For example, in the case of a WINDOW operating system implementation, the hardware status is obtained from the Windows Management Interface. Many unit types have a hardware status that is reported to Windows. This field is specific to the unit. However, by convention a non-zero status denotes an error. By using existing documentation, the test system translates these statuses using a built-in table. For example, a device driver has statuses between 0 and 31. Status zero denotes successful functioning of the driver. Another of the status values, for example, 29, indicates that the device is disabled because the firmware of the device did not give it the required resources.

Along with name and status, each hardware object has a parent pointer 508 to its parent object in the hierarchy and a child pointer 510 to each child object in the hierarchy. It will be appreciated that there may be multiple child pointers if a hardware object has multiple children or the pointer may be null if there are no children hardware objects.

Hardware units may be equivalent relative to a particular set of end-user components. This may be used to reduce the number of times a test program is run. For example, suppose Test-A is an I/O test that targets logical drives and the test has already been run as part of a checkout of SCSI controller A. SCSI controller A is known to map to physical disk 1, which in turn maps to logical drives C and D. If the test is required to run against PCI-BUS-1, which has physical disk-1 as the only physical disk on the bus, then running this test against PCI-BUS-1 would duplicate the test run against SCSI controller A. Thus, SCSI-Controller-A and PCI-BUS-1 are equivalent relative to logical drives C and D, and running Test-A against PCI-BUS-1 may be eliminated since the test was already run against SCSI-Controller-A. SCSI-Controller-A and PCI-BUS-1 are said to be in the "hardware equivalence group." Each hardware object contains an equivalence pointer 512 to the hardware equivalence group 520 for that object.

Hardware equivalence groups can be created for each defined type of hardware unit. For example, there may be a set of hardware equivalence groups defined for each of the following units: processor-nodes, processor buses, processors, etc. The only information required to define the hardware equivalence groups (as opposed to the "logical equivalence groups" described below) is the hardware configuration (including the hierarchical mapping). Since this information is obtained when the test system starts, hardware equivalence groups may be defined up front.

Once a test is selected for execution, the end-user component for that test determines which hardware equivalence groups are relevant to the decision making.

Starting with a hardware configuration, and hierarchical mapping, hardware equivalence groups are created as follows. For creating hardware equivalence groups for processors, each processor in the system always identifies a group of one. For example, hardware equivalence group 1 includes CPU 1, hardware equivalence group 2 includes CPU 2, and hardware equivalence group n includes CPU n. The process of creating hardware equivalence groups then moves to the next higher unit in the hierarchy, for example, the bus level, after creating the hardware equivalence groups for the processors. If CPUs 1 and 2 are coupled to bus 1, for example, hardware equivalence group n+1 is created to include CPU 1 and CPU 2. Similarly, if CPUs 3 and 4 are coupled to bus 2, for example, hardware equivalence group n+2 is created to include CPU 3 and CPU 4. Each hardware object that represents a bus such as the bus 1 hardware objects has a link to the hardware equivalence group for that bus.

Moving up the hierarchy, the next level to process is that of proc-nodes. One or more hardware equivalence groups may be created for the proc-nodes. The hardware equivalence group for a proc-node includes the processors on the buses that are children of the proc-node. For example, in FIG. 4, the hardware equivalence group for proc-node1 includes CPU 0, CPU 1, CPU 2, and CPU 3. The creating of hardware equivalence groups continues up the hierarchy to the cells for the system.

In creating a hardware equivalence group, if an identical one exists, the existing hardware equivalence group is used instead of creating a new one. An identical group has exactly the same number and type of hardware objects. For example, if there is only one processor-node per cell, both the cell and its associated proc-node would point to the exact same set of processors. Execution of a test against each cell and each proc-node may be bypassed for a test that has a processor as the end-user component because execution would be redundant since both executions would target the exact same set of processors.

A hardware object may have links to more than one hardware equivalence group. A proc-node, for example, may have a link to a processor equivalence group and another link to a processor-bus equivalence group. However, for each unit TYPE, there is one and only one hardware equivalence group.

A hardware object may have an equivalence pointer 512 to an equivalence group 520. An equivalence group includes a list of equivalent hardware units 522 and a list of tests executed 524 against those hardware units. The list 522 of equivalent hardware units identifies those hardware units that are equivalent to the hardware unit represented by the referencing hardware object 500. If a test is being considered for execution against a specific hardware unit as represented by hardware object 500, the list 524 of tests executed against equivalent hardware units may be consulted. If the test has already been executed against an equivalent hardware unit, then the test need not be re-executed against the hardware unit of object 500.

Two units may be equivalent relative to one set of lower level hardware units, but not equivalent relative to another set of lower level hardware units. For example, two hardware units may map to the same physical disks but not to the same logical drives. A test that targets physical disks need only run once. But a test that targets logical drives may need to run twice to ensure that the hardware unit is properly tested.

Figure 6:
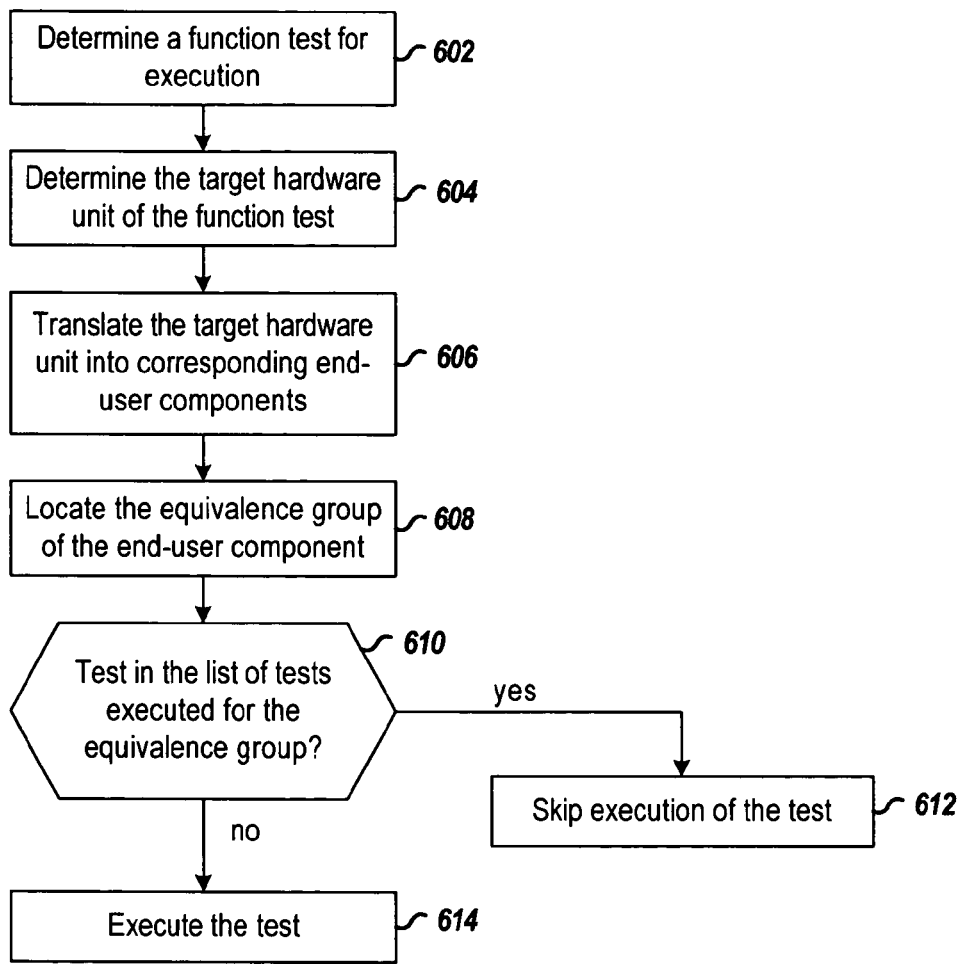
FIG. 6 is a flowchart of an example process for determining whether a test should be executed in accordance with one embodiment of the invention.

FIG. 6 is a flowchart of an example process for determining whether a test should be executed in accordance with one embodiment of the invention. A function test is selected for execution based on the functional area of the system the user desires to test (step 602). For example, a test descriptor may be selected according to the functional area to be tested, such as a system bus. A specific target hardware unit for the function test, such as a PCI bus, is determined based on user input (step 604). A test descriptor (FIG. 2, 214) of the function test describes the end-user components for which the selected test program associated with the test descriptor expects input parameter values. For example, the test program may require input of the name of one or more physical disks. The target hardware unit (e.g., a named instance of a PCI bus) is then translated into the corresponding end-user components (e.g., disk 0 and disk 1, step 606).

The hardware equivalence group of the end-user component is determined (step 608). If the selected function test (as named in the test descriptor) is in the list of tests executed for the hardware equivalence group (decision step 610), then execution of the test is bypassed (step 612). Otherwise, the test is executed using the name of an end-user component as an input parameter value (step 614).

Figure 7:
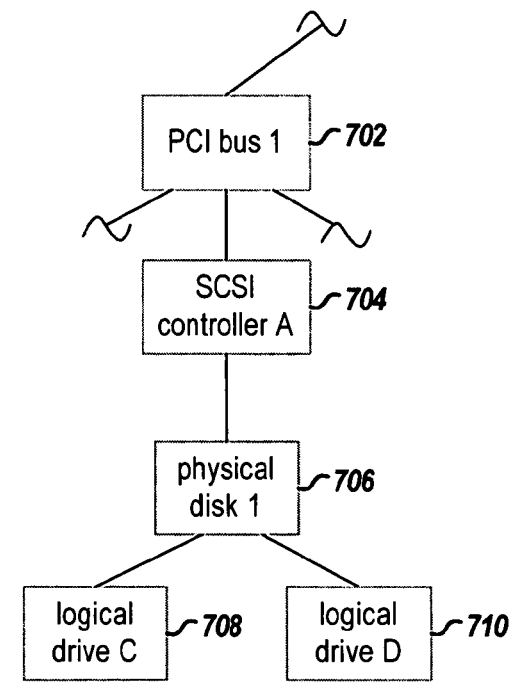
FIG. 7 is a hierarchical block diagram of an example partial system configuration.

FIG. 7 is a hierarchical block diagram of an example partial system configuration. The diagram shows two hardware units for which a hypothetical test may be skipped. PCI bus 1 is represented by block 702, and SCSI controller A is coupled to the PCI bus 1 as represented by block 704. SCSI controller A is mapped to physical disk 1 (block 706), which in turn maps to logical drives C and D (blocks 708 and 710, respectively).

Hardware units PCI bus 1 and SCSI controller A are equivalent relative to logical drives C and D. Thus, as previously described, if Test-A is an I/O test that targets logical drives and the test has already been run to test SCSI controller A, the test may be skipped if it is later desired to be run against PCI bus 1.

In addition to the above-described hardware equivalence group (e.g., SCSI controller A and PCI-bus 1), a second type of equivalence is used to reduce unnecessary testing. The second type of equivalence uses equivalence classes. In some contexts, hardware units may be members of an equivalence class and thereby considered logically equivalent even though the hardware units do not map to the same end-user components. For example, in a multi-cell system, the proc-nodes on one cell may have some equivalency relationship to the proc-nodes on another cell because for some purposes the proc-nodes mirror each other in functional behavior. Logical equivalence is tied directly to a test or type of test because units may be considered similar in one context and different in another.

Logical equivalence may be used to minimize test time when execution time is limited, and/or the system is very large. Logical equivalence is used in select cases, is test dependent, and may be employed when external time constraints limit testing. For example, a system may include hundreds of physical disks. Ideally, each physical disk would be tested to ensure correct operation. However, there may be insufficient time available to verify each disk individually. In another example, in a multiple cell system it may be sufficient to verify cache coherency on one cell, rather than all the cells. On the other hand, it may be important to test cache priority on each cell, since the I/O connections may be significantly different. Thus, whether two units may be treated as being logically equivalent depends largely on the function being tested.

Figure 8:
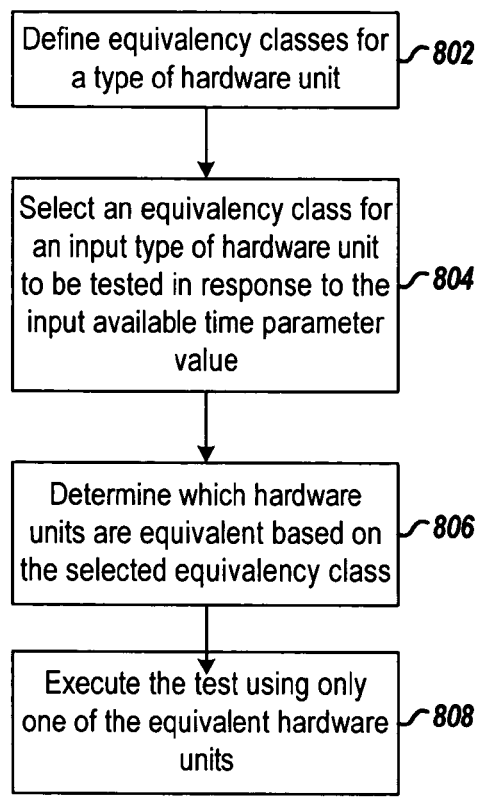
FIG. 8 is a flowchart of an example process for selecting a hardware unit to test using equivalence classes for types of hardware units.
Figure 9:
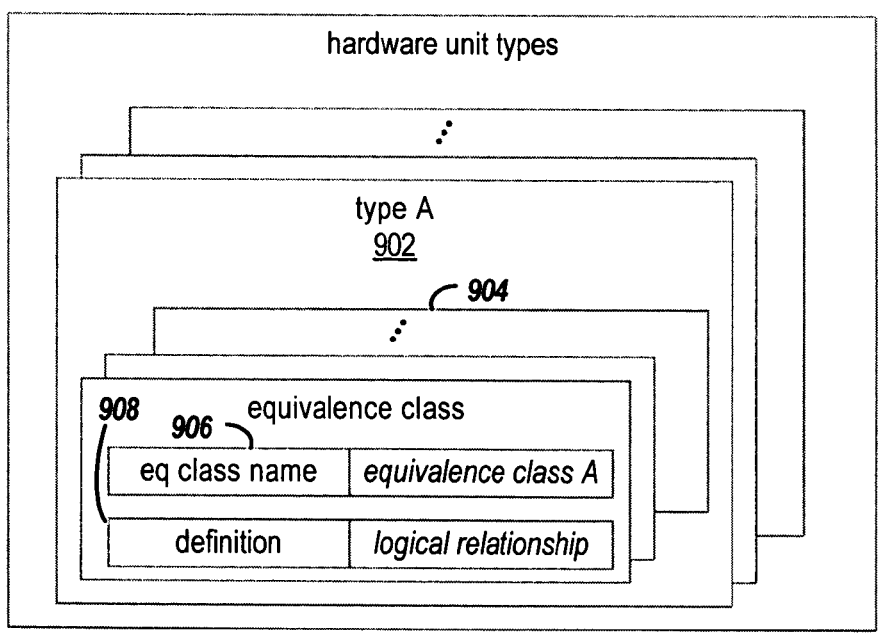
FIG. 9 is a block diagram that shows a representation of equivalence classes for different hardware types.

FIG. 8 is a flowchart of an example process having steps 802, 804, 806, and 808 for selecting a hardware unit to test using equivalence classes for types of hardware units; and FIG. 9 is a block diagram that shows a representation of equivalence classes for different hardware types. FIGS. 8 and 9 are described together.

A user may define equivalence classes for one or more types of hardware units (step 802). In general, multiple equivalence classes can be defined for each type of hardware unit. For example, hardware unit type A 902 has multiple equivalence classes 904. Each equivalence class has a class name 906 and a definition 908. For example, the class name may be class A, and the definition may specify a logical relationship between two units. The definition may specify that two units are considered equivalent if and only if the units map to the exact same end-user component. Apart from two units being one in the same, this is the most stringent of the equivalence classes.

The least stringent equivalence class treats all hardware units of the same type as being equivalent. If a test is executed while this equivalence class in effect, the test would only need to be run against any one unit of the given type. For example, if this equivalence class is used because time constraints are severe, an I/O test might only need to run against one physical disk even though the system may contain hundreds of disks.

Between the most and least stringent equivalence classes, a number of equivalence classes may be defined. An example of a plausible class for a physical disk hardware unit might consider two physical disks to be equivalent if they use the same controller, same device driver, are on the same bus, and are located on the same SCSI port. An example of a plausible equivalence class for a logical drive might consider two logical drives equivalent if they map to the same set of physical disks, and are of the same drive type.

A typical class for units such as processor nodes and I/O nodes might define units to be equivalent if they are located on the same cell. Below are several other examples of equivalence relationships.

Class-A: UnitA~UnitB if and only if UnitA=UnitB (default case)

Class-B: UnitA~UnitB if and only if they map to the same end-user component

Class-C: UnitA~UnitB if and only if they are the same hardware type

Class-D: UnitA~UnitB if and only if they belong to the same cell and same type

Class-E: UnitA~UnitB if and only if they are on the same bus

Sets of equivalence classes are associated with the types of hardware units, and the same set of classes may not be pertinent to each type of hardware unit. Also, the equivalence classes used in testing depends on both the active test, and any current time constraints.

Logical equivalence is tied to a confidence test. When a confidence test is defined, it may specify a set of equivalence classes to use based on the user-specified time available for testing. For example, there may be an equivalence class to use when there is some minimum amount of time available for testing and an equivalence class to use when there is a moderate amount of time available for testing. If there are no time constraints, each unit may be treated as unique and the test run against each unit of the given type.

Thus, the user inputs a value that indicates the time available for testing, and the process selects an equivalence class based on the time available and the classes specified for the different amounts of time (step 804). It will be appreciated that different ranges of times may be used to quantify minimum and moderate times.

Based on the selected equivalence class, the specified definition 908 is used to determine which hardware units are equivalent (step 806). The test is then executed using only one of the equivalent hardware units (step 808).

Additional requirements beyond time constraints may be incorporated into equivalence classes. For example, one equivalence class could be used if there is a moderate amount of time available and the number of hardware units is less than a selected number, n. Another could be used if there is a moderate amount of time available, but the number of units is greater than or equal to n.

Each hardware component may be assigned a numerical level number. The level number may be used to divide the components into manageable, logical groups, based on size and/or complexity. Once assigned, the level numbers may be used to help control execution time and/or execution order.

A hardware object may be assigned a level number based on the hierarchical level that the object occupies (FIG. 4). For example, the cells in a system might be at level 1 in the hierarchy and be assigned level number 1, the processor nodes and I/O nodes may be at level 2 and be assigned level number 2, and the PCI-bridges may be at level 3 and be assigned level number 3. Units at levels of the hierarchy nearer the system object may be assigned lower level numbers, and those objects nearer leaves of the hierarchy (usually end-user components) may be assigned higher level numbers.

The level numbers may be used to divide the configuration into discrete subsets. For example, the hardware objects may be divided into high-level objects, intermediate level objects, and low-level objects based on ranges of level numbers. It will be appreciated that any number of desirable ranges may be defined. In the example below (a typical scheme) several intermediate levels are defined.

Range of level numbers 1-3—High level object
Range of level numbers 4-5—Intermediate level object, type1
Range of level numbers 5-8—Intermediate level object, type 2
Range of level numbers 9-12—Intermediate level object, type 3
Range of level numbers >12—Low Level Component In another variation, each object component may be assigned a hardware component level number based on other, more specific criteria. For example, the assignment could be based on the relative design complexity of the unit. This necessarily requires some domain knowledge of the system, but can provide a meaningful division of units.

Alternatively, the level number could be based on the number of associated end-user components. For example, a PCI bus with ten physical disks attached may be assigned a level number of 7 (intermediate level, type 2), whereas a PCI bus with one hundred physical disks may be assigned a level number of 4 (intermediate level, type 1).

An implementation may choose to assign values using a combination of criteria. In practice, a particularly useful division scheme uses a combination of hierarchical level and number of end-user components. Once assigned, these values can be used to help control execution time and/or execution order.

In some test implementations the same test may run against a variety of different hardware units. For example, a test may be used to check out Controller-A, and Controller-A may have only one physical disk associated with it. The same test may be used to check out Controller-B, which may have fifty physical disks associated with it. The test may not have to run as long in order to check out Controller-A as it would to check out Controller-B. However, some tests are designed in such a way that they perform random sequences and such tests tend not to execute for a fixed period of time. Instead these tests run until terminated or until the requested time has expired.

For a test that does not run for a fixed length of time, the level number of a hardware object, in conjunction with test specific time ranges, may be used to determine the appropriate amount of time to run the test against each hardware component. A range of execution times may be specified for tests that do not run a fixed length of time. This range may provide a guideline for assigning execution times. The minimum execution time corresponds to the time that test should run when targeting low-level components. The maximum time corresponds to the amount of time a test should run for targeting high-level components. Interim times reflect the time to allocate for intermediate level components. This approach allows test coverage to be maintained without requiring tests to run for long periods of time when the size of the target component deems such extended times unnecessary.

Figure 10:
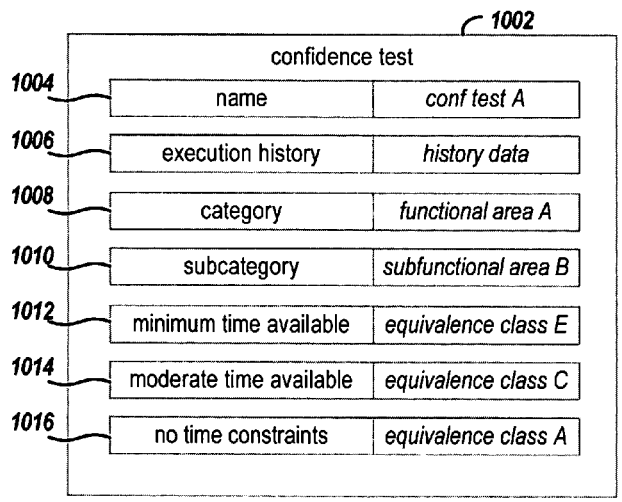
FIG. 10 is a block diagram that shows data stored for defining a confidence test in accordance with an example embodiment.

FIG. 10 is a block diagram that shows data stored for defining a confidence test 1002 in accordance with an example embodiment. Confidence tests may be defined in such a way that they are both independent and dependent on the current hardware configuration. Generally, a confidence test is used to describe how the system should be tested, and the test descriptors provide the mechanism for actually testing.

Each confidence test has an associated unique name 1004 and execution history 1006. In addition, each confidence test specifies a category 1008 and sub-category 1010. A confidence test may be associated with specific functional and performance characteristics as well.

The categories for the confidence tests may be identical to the test categories of the test descriptors (FIG. 2, 216) or may form a super-set of those categories. Categories represent the major functional areas of the system that must be tested. Example confidence test categories include cache, I/O, memory, processor and network.

The subcategories of the confidence tests specify with further specificity aspects of the category that are tested. For example, for a processor, the subcategories may include: interrupt handling, scheduling, processor busy, arithmetic section, floating point, logical processors, translation lookaside buffer, first-level cache (FLC), second-level cache (SLC), third-level cache (TLC), an instruction cache, and jump prediction.

A confidence test may also have associated data that specifies equivalence classes that may be used. For example, confidence test 1002 specifies equivalence classes 1012, 1014, and 1016 for use for a minimum amount of time available, a moderate amount of time available, and no constraints on the amount of time for testing, respectively.

A confidence test maps to one or more test descriptors. That is, there are one or more tests that are capable of testing the functionality specified by confidence test. A test defined by a test descriptor is considered a match if it has the same category and sub-category, meets all functional and performance requirements, and is capable of targeting the specified hardware component.

Each test descriptor and confidence test is required to have a category and sub-category, and each may have additional functional requirement. Functional requirements may be chosen from a list of previously defined options such as large transfers, small transfers, misaligned references, many interrupts, etc. In an example embodiment, the sub-categories are combined with functional requirements. For example, for a category of cache, the combined sub-categories and functional requirements may be specified as cache-coherency, cache-coherency-small-target, cache-coherency-large-target, cache-coherency-misaligned-references, etc. In another embodiment, the functional requirements could be "ANDed" together if desired—so that a test could have a confidence test could require both a large target AND misaligned references, for example.

In yet another embodiment, a performance requirement may also be associated with a confidence test. The requirement may be as general as specifying a High/Medium/low level of a particular performance measure. For example, a high level of interrupts. When a test is being selected to meet the requirements of this confidence test, first all tests with the appropriate category, sub-category, and functional requirements are selected. Once these tests are identified, the test having a performance indicator most closely corresponding to the performance requirement is selected. For example, if it is known that a test is designed to produce a high level of interrupts, it may contain a "high-interrupt" flag (performance requirement field). In the absence of any test specifically identified and producing a high level of interrupts, the performance history for each of these tests may be analyzed. The test with the highest level of interrupts (on a similar configuration) is selected.

Figure 11:
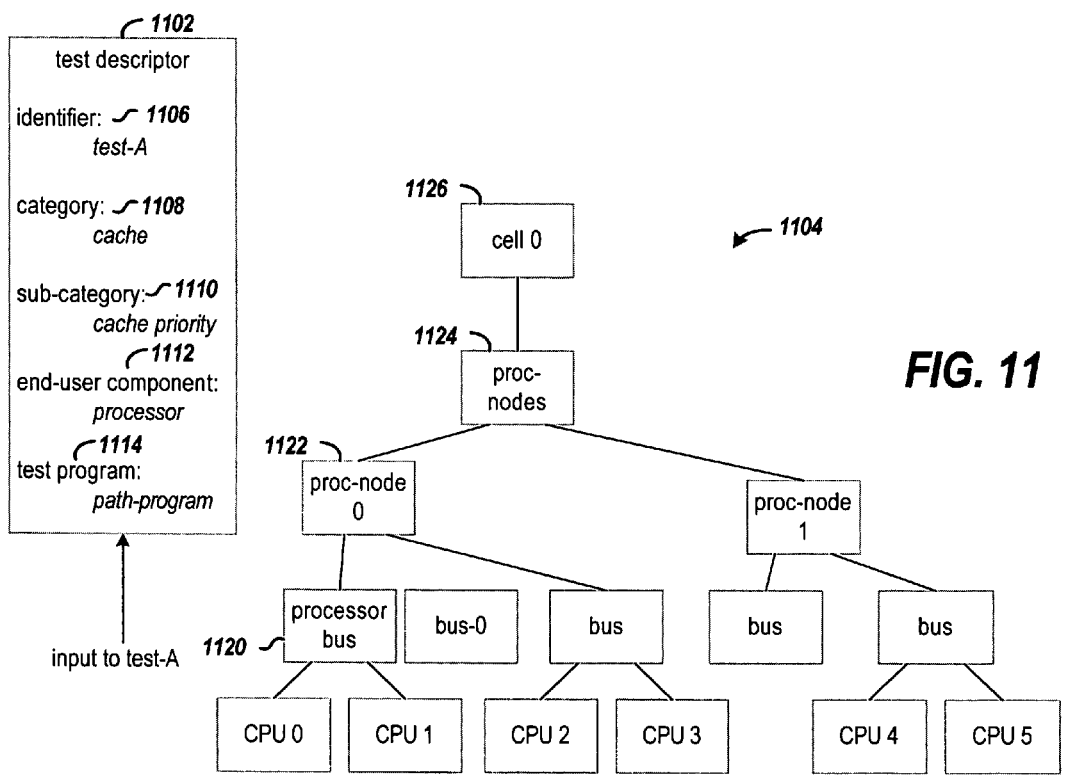
FIG. 11 shows an example test descriptor and the relationship to the hardware component hierarchy.

FIG. 11 shows an example test descriptor 1102 and the relationship to the hardware component hierarchy 1104. Each test descriptor has an associated identifier 1106 that specifically identifies the test descriptor, along with data that indicates a category 1108 and subcategory 1110, as described along with FIG. 10. The test descriptor also contains data that describes the type(s) of hardware unit(s) that it is capable of targeting. In particular, the test descriptor specifies an end-user component 1112 that indicates the targeted hardware unit. For example, if the test requires input of a list of target processors, the end-user component type would be a processor. The test descriptor also includes a data field 1114 that references by path name the executable test program that performs the test operations.

A test that is capable of targeting a particular hardware type may also be capable of targeting "ancestor" hardware objects that map or translate to that type. For example, a test that inputs processor identifiers may also be used to test processor nodes ("proc-nodes"), which are considered ancestors of the processors within the hierarchy of the tree structure of FIG. 11. The proc-nodes are considered ancestors hardware units of the processors because they are included in the hierarchy that connects the processors (e.g., CPU 0) to the root of the tree structure (i.e., cell 0 1126).

This testing of the ancestor proc-nodes may be accomplished by inputting identifiers of all processors having connections to that processor node. Similarly, a test that acts on physical disks can be used to test I/O buses and controllers by inputting to the test parameter values that specify all those physical disks connected to that device.

A specific implementation may require that each test descriptor specifically delineate the set of all types of hardware units targeted by the test. Alternatively, the targeted hardware unit could be implicitly inferred from the end-user component specified in the test descriptor. If desired, a combination of the two methods could be used by including a flag in the test descriptor that indicates whether a unit is to use default assignment or not.

The explicitly tested end-user component in example test descriptor 1102 is a processor. By way of test descriptor 1102 and hierarchy 1104, it can be seen that processor bus 1120, proc-node 0 (1122), proc-nodes object 1124, and cell 1126 may be inferred as target unit types from the explicit end-user component of processor. Thus, if the desired target is proc-node 0, then identifiers for CPU 0 and CPU 1 may be input to the test program referenced by test descriptor 1102.

A test descriptor may specify multiple end-user components. The test may contain parameters for both physical disks and processors, for example. It may also contain a parameter that specifies the amount of physical memory it should use. One of the configuration parameters is specified as the primary parameter. In the case of an I/O test (category=I/O) with end-user components of both physical disks and processors, the primary configuration type might be the physical disks or logical drives. In the case of a processor test (category=processor), the primary end-user component parameter would most likely be processor. A test that matches the target unit type of the confidence test at a primary level will be selected over a test that matches only at the secondary level.

If a confidence test has a target unit type that translates to more than one end-user component type (as is the case with some logical units), the selected test must contain parameters of both types—with preference given to a test that has both unit types marked primary.

Figure 12:
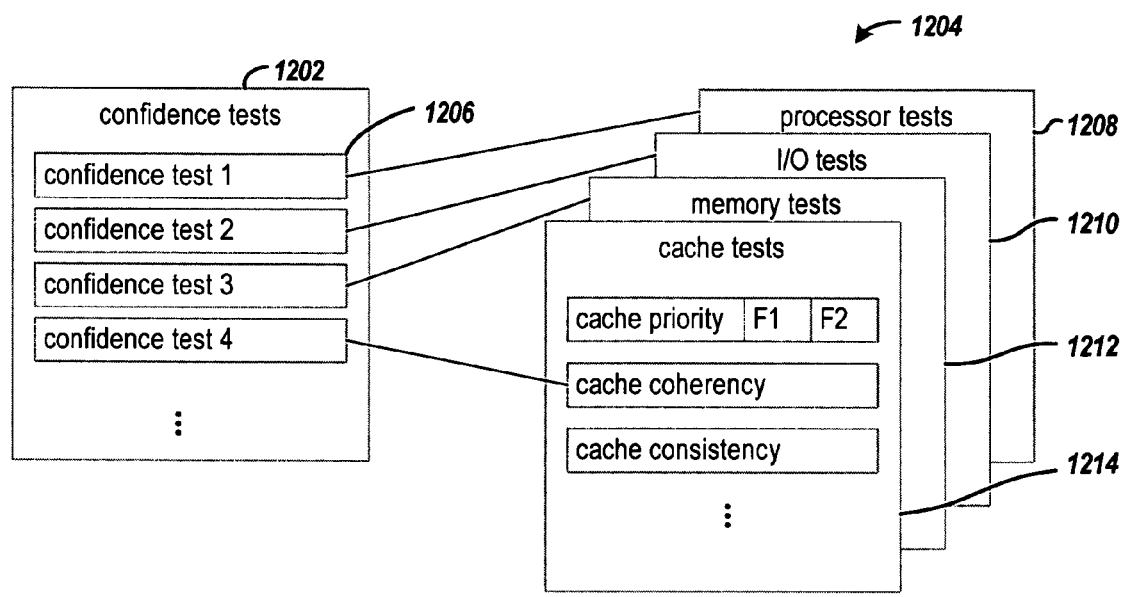
FIG. 12 shows the functional relationship between a set of confidence tests and tests in a test base.

FIG. 12 shows the functional relationship between a set 1202 of confidence tests and tests in a test base 1204. As described earlier, a confidence test describes how the system should be tested, and the test base provides the mechanism for performing the desired testing.

The categories for the confidence tests may be identical to the test-base categories. For example, the category of confidence test 1 (1206) may be processor, which is the same as the categories of the test descriptors in the set 1208 of processor test descriptors. Alternatively, the category of a confidence test may be a super-set of the original categories.

The test base 1204 contains sets of test descriptors with information about each currently defined test. The sets 1208, 1210, 1212, and 1214 of test descriptors correspond to the categories specified by the tests descriptors. For example, the test descriptors in set 1214 have a category of cache.

Tests categories and characteristics provide a mechanism for selecting tests based on the aspect of the system they are designed to test. Because they link similar tests, they are also useful for minimizing test redundancy, as well as ensuring appropriate test coverage. We will see later how test categories are used to map a confidence test with one or more tests in the test base.

Figure 13:
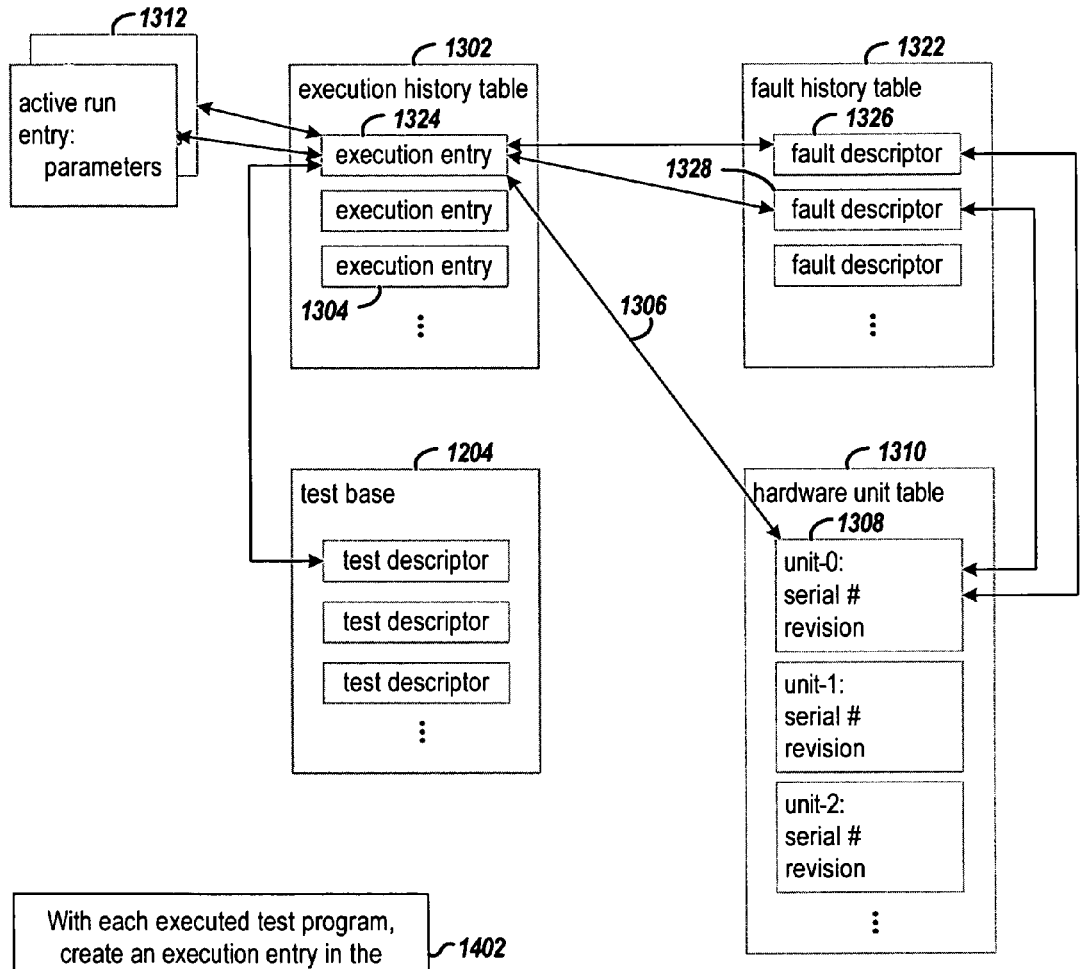
FIG. 13 is a block diagram that illustrates the data that is assembled as tests are executed according to an example embodiment.

FIG. 13 is a block diagram that illustrates the data that is assembled as tests are executed according to an example embodiment. Data that describes the execution history of a test is stored for each test as the test is executed. Sufficient data is saved for an executing test to exactly duplicate a test execution.

The execution history table 1302 contains execution entry objects, e.g., 1304, and each execution entry object contains the information needed to duplicate a test execution. An execution entry object contains data such as the run-time parameters and a reference 1306 to a targeted hardware object 1308. A hardware object may include revision and serial numbers if the numbers are available. The begin and end times of the execution are tracked in an execution entry object, along with detailed test status data that includes the name and location of any output or summary files.

The execution history table 1302 may be used to provide to a user a visual display of all executed tests. The execution entry objects may be sorted on any field, allowing the user to easily sort the objects by status, target unit, time of execution.

A multi-dimensional hash table 1310 is maintained to organize the hardware objects. The table allows the hardware objects to be indexed by types of hardware units, for example, physical disks, and names of the units.

The active run objects 1312 contain specific information about each of the runs associated with the test. This information includes input parameter, as well as termination status, and individual test failure status. The execution entries in the execution history 1302 contain links to the active run objects. Generally, there is one active run object for each executable associated with a test. If multiple copies of a test were started, the number of active run objects for a test may be greater than one.

For failing tests, the execution entry links to one or more fault descriptor objects in the fault descriptor table 1322. For example, execution entry object 1324 is linked to fault descriptors 1326 and 1328. A fault descriptor object contains detailed information about a fault including a type, sub-type, description, output files, and target unit. There is also a link back to the execution entry object.

The types, sub-types, and descriptions for a fault descriptor may be implementation dependent. However, in an example implementation, the following types are defined:
```
public enum FaultTypes
{
SYSTEM_STOP=0,
SYSTEM_HANG=1,
TEST_FAILURE=2,
TEST_HANG=3,
TEST_ABORT=4,
TEST_TIMEOUT=5,
INTERNAL_ERROR=6,
HARDWARE_ERROR=7,
WARNING=8,
UNKNOWN=9,
SHUTDOWN=10,
PRELIMINARY_CHECK=11,
CONFIGURATION_ERROR=12,
SYSTEM_EVENT=13
}
public enum Severity
{
CRITICAL=0,
NON_CRITICAL=1,
WARNING=2,
UNKNOWN=3
}
```

Example sub-types for test-failure in a specific implementation include verification error, I/O error, file error, internal error, memory error, timeout, and insufficient resource. For system stops, the sub-type is one of the system provided stop-codes. For system-events, the sub-types are the system-provided log event-ids. For test abort, the sub-types are error-exit, segmentation fault, etc.

The description consists of as much information as feasible about the errors. For system stops, the stop codes are translated using tables built into the system. In one embodiment, the tables are built using WINDOWS operating system documentation. For event-log entries, the text of the event logs is employed as the description. For test error exits, the description consists of the exit-code, and when possible the translation of the exit-code system and test documentation.

The fault history table 1322 may be sorted on any field of the fault descriptor objects.

By way of the interlinked active run objects, execution history objects, fault history objects, test descriptors and hardware objects, lists of all failures associated with a particular hardware unit, all failures associated with a test, or all the faults related to a particular execution are examples of easily accessible test information.

Figure 14:
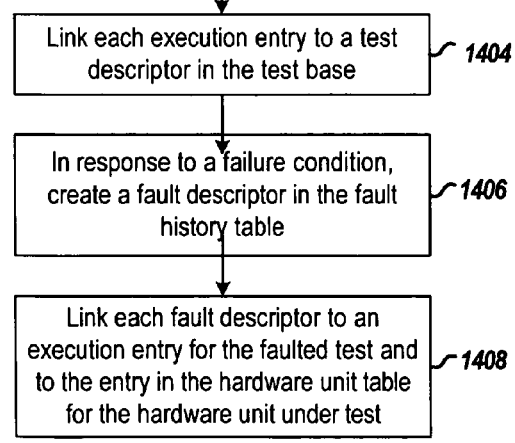
FIG. 14 is a flowchart of an example process for managing history information in executing tests.

FIG. 14 is a flowchart of an example process for managing history information in executing tests. The test management system 202 (FIG. 2) creates an execution entry object for each executed test program (step 1402). The execution entry object for a test is bi-directionally linked to a test descriptor in the test base (step 1404). The bi-directional link provides convenient access to a test descriptor when an execution entry object is viewed or known and convenient access to an execution entry when a test descriptor is known.

In response to a failure condition, the test management system creates a fault descriptor object in the fault history table (step 1406). The fault descriptor object is bi-directionally linked to the execution entry and bi-directionally linked to hardware object in the hardware unit table corresponding to the hardware unit under test (step 1408)

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for testing an electronic system, comprising:
    determining hardware units of a hardware configuration of the system;
    inputting a time constraint parameter value that describes an amount of time available for testing the system;

inputting a hardware unit type identifier that specifies a first type of hardware unit of the electronic system to be tested;

selecting from a database that describes a plurality of test programs, at least one test program that tests the type of hardware unit to be tested, wherein the database specifies for each test program, each type of hardware unit tested by the test program;

determining identifiers of a subset of the hardware units of the configuration for testing based on the input time constraint parameter value and the type of hardware unit tested by the at least one test program;

providing the identifiers of the subset of hardware units as input to the at least one test program; and executing the at least one test program on the electronic system.

2. The method of claim 1, wherein the determining of identifiers of a subset of the hardware units further comprises:

determining equivalence of hardware units in the configuration of the system; and selecting at least one hardware unit from hardware units determined to be equivalent, wherein the selected at least one hardware unit is the subset of hardware units of the configuration.

3. The method of claim 2, further comprising:

assigning in the database respective priority values to each of the plurality of test programs;

wherein the selecting of at least one test program includes identifying from the database a plurality of test programs, and the test programs in the identified plurality of test programs have equivalent sets of types of hardware units tested by the test programs; and selecting one of the identified plurality of test programs having the highest priority.

4. The method of claim 3, further comprising:

creating a hierarchy representative of the hardware units of the system;

determining for each test program, a set of one or more identifiers of end-user components required as one or more input parameters to the test program;

determining for each set of the one or more identifiers of end-user components, an associated set of identifiers of ancestor hardware units in the hierarchy;

recording in association with each set of identifiers of ancestor hardware units, an identifier of each test program executed with input parameters equal to identifiers in the associated set of one or more identifiers of end-user components;

inputting a first identifier of a first hardware unit of the system; and bypassing execution of the selected test program in response to an identifier of the selected test program being recorded in association with a set of identifiers of ancestor hardware units having the first identifier of the first hardware unit.

5. The method of claim 4, further comprising:

defining a plurality of equivalency classes for the first type of hardware unit, wherein each equivalency class defines an equivalency relationship between two hardware units of the first type, and a first hardware unit of the first type is equivalent to a second hardware unit of the first type if the first hardware unit and the second hardware unit satisfy the equivalency relationship;

selecting an equivalency class as a function of the input time constraint parameter value;

determining a set of identifiers of hardware units of the first type that are equivalent using the equivalency relationship of the selected equivalency class; and executing the at least one test program using only one identifier of a hardware unit from the set of identifiers of hardware units in response to a plurality of hardware units of the first type being equivalent.

6. The method of claim 3, further comprising:

defining a plurality of equivalency classes for the first type of hardware unit, wherein each equivalency class defines an equivalency relationship between two hardware units of the first type, and a first hardware unit of the first type is equivalent to a second hardware unit of the first type if the first hardware unit and the second hardware unit satisfy the equivalency relationship;

selecting an equivalency class as a function of the input time constraint parameter value;

determining a set of identifiers of hardware units of the first type that are equivalent using the equivalency relationship of the selected equivalency class; and executing the at least one test program using only one identifier of a hardware unit from the set of identifiers of hardware units in response to a plurality of hardware units of the first type being equivalent.

7. The method of claim 2, further comprising:

creating a hierarchy representative of the hardware units of the system;

determining for each test program, a set of one or more identifiers of end-user components required as one or more input parameters to the test program;

determining for each set of the one or more identifiers of end-user components, an associated set of identifiers of ancestor hardware units in the hierarchy;

recording in association with each set of identifiers of ancestor hardware units, an identifier of each test program executed with input parameters equal to identifiers in the associated set of one or more identifiers of end-user components;

inputting a first identifier of a first hardware unit of the system; and bypassing execution of the selected test program in response to an identifier of the selected test program being recorded in association with a set of identifiers of ancestor hardware units having the first identifier of the first hardware unit.

8. The method of claim 2, further comprising:

defining a plurality of equivalency classes for the first type of hardware unit, wherein each equivalency class defines an equivalency relationship between two hardware units of the first type, and a first hardware unit of the first type is equivalent to a second hardware unit of the first type if the first hardware unit and the second hardware unit satisfy the equivalency relationship;

selecting an equivalency class as a function of the input time constraint parameter value;

determining a set of identifiers of hardware units of the first type that are equivalent using the equivalency relationship of the selected equivalency class; and executing the at least one test program using only one identifier of a hardware unit from the set of identifiers of hardware units in response to a plurality of hardware units of the first type being equivalent.

9. The method of claim 1, further comprising:

creating a hierarchy representative of the hardware units of the system;

determining for each test program, a set of one or more identifiers of end-user components required as one or more input parameters to the test program;

determining for each set of the one or more identifiers of end-user components, an associated set of identifiers of ancestor hardware units in the hierarchy;

recording in association with each set of identifiers of ancestor hardware units, an identifier of each test program executed with input parameters equal to identifiers in the associated set of one or more identifiers of end-user components;

inputting a first identifier of a first hardware unit of the system; and bypassing execution of the selected test program in response to an identifier of the selected test program being recorded in association with a set of identifiers of ancestor hardware units having the first identifier of the first hardware unit.

10. The method of claim 1, further comprising:

defining a plurality of equivalency classes for the first type of hardware unit, wherein each equivalency class defines an equivalency relationship between two hardware units of the first type, and a first hardware unit of the first type is equivalent to a second hardware unit of the first type if the first hardware unit and the second hardware unit satisfy the equivalency relationship;

selecting an equivalency class as a function of the input time constraint parameter value;

determining a set of identifiers of hardware units of the first type that are equivalent using the equivalency relationship of the selected equivalency class; and executing the at least one test program using only one identifier of a hardware unit from the set of identifiers of hardware units in response to a plurality of hardware units of the first type being equivalent.

11. An apparatus for testing an electronic system, comprising:

means for identifying hardware units of a hardware configuration of the system;

means, responsive to an input hardware unit type identifier, for selecting from a database that describes a plurality of test programs, at least one test program that tests the type of hardware unit to be tested, wherein the database specifies for each test program, each type of hardware unit tested by the test program, wherein the hardware unit type identifier specifies a first type of hardware unit of the electronic system to be tested;

means, responsive to an input time constraint parameter value, for determining identifiers of a subset of the hardware units of the configuration to be tested based on the input time constraint parameter value and the type of hardware unit tested by the at least one test program, wherein the time constraint parameter value describes an amount of time available for testing the system;

means for inputting the identifiers of the subset of hardware units to the at least one test program; and means for executing the at least one test program on the electronic system.

12. The apparatus of claim 11, further comprising:

means for creating a hierarchy representative of the hardware units of the system;

means for determining for each test program, a set of one or more identifiers of end-user components required as one or more input parameters to the test program;

means for determining for each set of the one or more identifiers of end-user components, an associated set of identifiers of ancestor hardware units in the hierarchy;

means for recording in association with each set of identifiers of ancestor hardware units, an identifier of each test program executed with input parameters equal to identifiers in the associated set of one or more identifiers of end-user components; and means, responsive to an identifier of the selected test program being recorded in association with a set of identifiers of ancestor hardware units having an input first identifier of the first hardware unit, for bypassing execution of the selected test program.

13. The apparatus of claim 11, further comprising:

means for defining a plurality of equivalency classes for the first type of hardware unit, wherein each equivalency class defines an equivalency relationship between two hardware units of the first type, and a first hardware unit of the first type is equivalent to a second hardware unit of the first type if the first hardware unit and the second hardware unit satisfy the equivalency relationship;

means for selecting an equivalency class as a function of the input time constraint parameter value;

means for determining a set of identifiers of hardware units of the first type that are equivalent using the equivalency relationship of the selected equivalency class; and means for executing the at least one test program using only one identifier of a hardware unit from the set of identifiers of hardware units in response to a plurality of hardware units of the first type being equivalent.

14. A system for testing an electronic system, comprising:

a plurality of test programs;

a test descriptor database having data that describes for each test program, each type of hardware unit of the electronic system tested by the test program; and a test manager coupled to the plurality of test programs and to the test descriptor database, the test manager configured to establish data that identifies hardware units of a hardware configuration of the system, to select, responsive to input of a hardware unit type identifier that specifies a first type of hardware unit of the electronic system to be tested, at least one test program that tests the type of hardware unit to be tested, to select, responsive to input of a time constraint parameter value that describes an amount of time available for testing the system, identifiers of a subset of the hardware units of the configuration for testing based on the input time constraint parameter value and the type of hardware unit tested by the at least one test program, and to initiate execution of the at least one test program on the electronic system with input of the identifiers of the subset of hardware units to the at least one test program.

15. The system of claim 14, wherein the test manager is further configured to determine equivalence of hardware units in the configuration of the system, and to select at least one hardware unit from hardware units determined to be equivalent, wherein the selected at least one hardware unit is the subset of hardware units of the configuration.

16. The system of claim 15, wherein the test manager is further configured to associate respective priority values with the plurality of test programs identified in the database, and to select, in response to a plurality of test programs identified in the test descriptor database having equivalent sets of types of hardware units tested by the plurality of test programs including the input hardware unit type identifier, one of the identified plurality of test programs having the highest priority.

17. The system of claim 16, wherein the test manager is further configured to establish a hierarchy that represents hardware units of the system, to determine for each test program, a set of one or more identifiers of end-user components required as one or more input parameters to the test program, to determine for each set of the one or more identifiers of end-user components, an associated set of identifiers of ancestor hardware units in the hierarchy, to associate with each set of identifiers of ancestor hardware units, an identifier of each test program executed with input parameters equal to identifiers in the associated set of one or more identifiers of end-user components, and to bypass execution of the selected test program for a first hardware unit having a user-input first identifier, in response to an identifier of the selected test program being recorded in association with a set of identifiers of ancestor hardware units having the first identifier of the first hardware unit.

18. The system of claim 17, wherein the test manager is further configured to establish definitions of a plurality of equivalency classes for the first type of hardware unit, wherein each equivalency class defines an equivalency relationship between two hardware units of the first type, and a first hardware unit of the first type is equivalent to a second hardware unit of the first type if the first hardware unit and the second hardware unit satisfy the equivalency relationship, to select an equivalency class as a function of the input time constraint parameter value, to determine a set of identifiers of hardware units of the first type that are equivalent using the equivalency relationship of the selected equivalency class, and to initiate execution of the at least one test program using only one identifier of a hardware unit from the set of identifiers of hardware units in response to a plurality of hardware units of the first type being equivalent.

19. The system of claim 14, wherein the test manager is further configured to establish a hierarchy that represents hardware units of the system, to determine for each test program, a set of one or more identifiers of end-user components required as one or more input parameters to the test program, to determine for each set of the one or more identifiers of end-user components, an associated set of identifiers of ancestor hardware units in the hierarchy, to associate with each set of identifiers of ancestor hardware units, an identifier of each test program executed with input parameters equal to identifiers in the associated set of one or more identifiers of end-user components, and to bypass execution of the selected test program for a first hardware unit having a user-input first identifier, in response to an identifier of the selected test program being recorded in association with a set of identifiers of ancestor hardware units having the first identifier of the first hardware unit.

20. The system of claim 14, wherein the test manager is further configured to establish definitions of a plurality of equivalency classes for the first type of hardware unit, wherein each equivalency class defines an equivalency relationship between two hardware units of the first type, and a first hardware unit of the first type is equivalent to a second hardware unit of the first type if the first hardware unit and the second hardware unit satisfy the equivalency relationship, to select an equivalency class as a function of the input time constraint parameter value, to determine a set of identifiers of hardware units of the first type that are equivalent using the equivalency relationship of the selected equivalency class, and to initiate execution of the at least one test program using only one identifier of a hardware unit from the set of identifiers of hardware units in response to a plurality of hardware units of the first type being equivalent.

* * * * *